(12) United States Patent
Belmonte et al.

(10) Patent No.: US 8,162,616 B2
(45) Date of Patent: Apr. 24, 2012

(54) TURBOMACHINE FAN

(75) Inventors: Olivier Belmonte, Savigny le Temple (FR); Jean-Luc Christian Yvon Goga, Champagne sur Seine (FR)

(73) Assignee: SNECMA, Paris (FR)

( * ) Notice: Subject to any disclaimer, the term of this patent is extended or adjusted under 35 U.S.C. 154(b) by 1238 days.

(21) Appl. No.: 12/038,864

(22) Filed: Feb. 28, 2008

(65) Prior Publication Data

US 2008/0273980 A1    Nov. 6, 2008

(30) Foreign Application Priority Data

Feb. 28, 2007   (FR) ...................... 07 01421

(51) Int. Cl.
- *B64C 11/04* (2006.01)
- *F03B 3/12* (2006.01)
- *F04D 29/34* (2006.01)
- *B63H 1/20* (2006.01)
- *B63H 5/07* (2006.01)

(52) U.S. Cl. .................................. 416/220 R; 416/248

(58) Field of Classification Search ............. 416/220 R, 416/193 A, 248; 384/192, 202, 215
See application file for complete search history.

(56) References Cited

U.S. PATENT DOCUMENTS

| 4,943,172 | A  | * | 7/1990  | Waldrep ........................ 384/565 |
| 5,277,548 | A  |   | 1/1994  | Klein et al. |
| 5,873,144 | A  | * | 2/1999  | Tupper et al. .............. 16/18 CG |
| 6,457,942 | B1 | * | 10/2002 | Forrester .................... 416/220 R |
| 6,481,971 | B1 | * | 11/2002 | Forrester ........................ 416/221 |
| 6,634,863 | B1 |   | 10/2003 | Forrester et al. |
| 7,124,985 | B2 | * | 10/2006 | Crain et al. ................ 248/188.8 |
| 2004/0033105 | A1 |   | 2/2004 | North |

FOREIGN PATENT DOCUMENTS

| EP | 1 355 044 A2 |   | 10/2003 |
| EP | 1471267      | * | 10/2004 |
| GB | 949975       |   | 2/1964  |

OTHER PUBLICATIONS

U.S. Appl. No. 12/035,916, filed Feb. 22, 2008, Belmonte, et al.
U.S. Appl. No. 12/048,726, filed Mar. 14, 2008, Belmonte, et al.

* cited by examiner

*Primary Examiner* — Edward Look
*Assistant Examiner* — Su Htay
(74) *Attorney, Agent, or Firm* — Oblon, Spivak, McClelland, Maier & Neustadt, L.L.P.

(57) ABSTRACT

A turbomachine fan including blades and inter-blade platforms having radial flanges fastened to flanges of a rotor disk by threaded rods inserted into bushes mounted in orifices in the flanges of the platforms is disclosed. Each bush includes at least one deformable part interposed transversely between the threaded rod and an edge of the orifice in which the bush is mounted. The deformable part is intended to allow the platform to pivot in the event of an impact of a blade against the platform and to absorb some of the energy of the impact.

15 Claims, 2 Drawing Sheets

TURBOMACHINE FAN

The present invention relates to a fan of a turbomachine, such as an aircraft turbojet.

BACKGROUND OF THE INVENTION AND DESCRIPTION OF THE PRIOR ART

In a known manner, the fan provided at the upstream end of a turbojet comprises blades carried by a rotor disk, with platforms arranged between the blades and fastened by radial flanges to flanges of the disk by means of threaded rods inserted through bushes mounted in orifices in the flanges of the platform and through flanges of the disk, these platforms making it possible to guide the air stream entering the turbomachine and to avoid unwanted air flows toward the disk.

During the operation of the turbomachine, the breaking of the connection between a blade and the disk can result in the destruction of the adjoining platform. Specifically, the blade then comes up against the lateral edges of the platform and/or against the flanges of the platform, thereby producing a considerable stress on the fastenings used to fasten the platform flanges to the disk flanges and possibly causing these fastenings to break and the platform to be ejected into the air flow path, and resulting in the destruction of parts of the turbomachine that are located downstream.

To overcome this problem, it has been proposed to form deformable regions on the lateral edges of the platform. Another solution, which may, if appropriate, be used in combination with the preceding one, is to form abutment regions on the flanges of the disk to prevent contact between the platform and the blade. Hence, the stress is no longer borne by the platform but by the flange of the disk. However, these solutions are not satisfactory since they do not impart any flexibility to the connection between the flanges of the platform and the flanges of the disk and do not allow sufficient absorption of the energy due to the impact between the blade and the platform.

SUMMARY OF THE INVENTION

The object of the invention is in particular to make available a simple, economic and effective solution to these various problems.

Accordingly, the invention provides a turbomachine fan comprising blades carried by a rotor disk and inter-blade platforms having radial flanges fastened to corresponding flanges of the rotor disk by means of threaded rods inserted into positioning bushes mounted in orifices in the flanges of the platforms, wherein each bush comprises at least one deformable part interposed transversely between the threaded rod inserted into the bush and an edge of the orifice in which the bush is mounted, this deformable part being intended to allow the platform to pivot in the event of an impact of a blade against the platform and to absorb some of the energy of the impact.

In the event of a blade loss, the deformable region allows a local plastic deformation of the bush at the fastening regions of the threaded rods, thus preventing the fastenings between the flanges of the platform and the flanges of the disk being destroyed and the platform being ejected into the air flow path. The platform is not subject to any deformation and can thus be held in position during the time required to shut down the engine, so preventing major damage to the turbomachine. Maintenance operations are thus facilitated and only the bush deformed by the impact has to be replaced.

According to another feature of the invention, the deformable part of the bush is juxtaposed with a rigid part of the bush that is opposed to the deformable part with respect to the threaded rod.

The use of a two-part bush makes it possible to replace only that part of the bush which has been subject to deformation following the impact of a blade against the platform.

According to another feature of the invention, the deformable part comprises two parallel half-cylinders which are connected by deformable webs and whose concavities are oriented in the same direction, one half-cylinder being applied to the threaded rod and the other to an internal cylindrical surface of the orifice in the flange of the platform.

The radial bearing of a half-cylinder on an internal cylindrical surface of the orifice in the flange of the platform makes it possible to optimally transmit the stresses generated by the loss of a blade to the webs, which will deform and thus absorb some of the energy of the impact.

In a preferred embodiment of the invention, the ends of the two half-cylinders of the deformable part are aligned with cylindrical ends of the rigid part of the bush and substantially bear on these same ends.

Advantageously, the aligned ends of one of the half-cylinders of the deformable part and of the rigid part have interenengaged complementary indentations which immobilize the two parts of the bush with respect to one another against translational movement in the orifice in the flange of the platform.

According to another feature of the invention, the half-cylinders of the deformable part are connected by two substantially parallel webs joined to intermediate parts of the half-cylinders.

In the event of a blade loss, the two webs of material absorb the energy of the impact of the blade against the platform by deforming plastically. The shape and dimensions of these webs can vary quite widely in practice depending on the types of the turbomachines to which the invention is applied.

In one variant embodiment, the flange of the platform is fastened to the flange of the disk by means of two parallel threaded rods passing into two adjacent orifices in the flange of the disk and into a common orifice in the flange of the platform in which there is mounted an aforementioned bush comprising a rigid part and a deformable part, the rigid part being formed with an orifice for the passage of one threaded rod and with a half-orifice for the passage of the other threaded rod, the deformable part having the other half-orifice for the passage of the other threaded rod.

This variant prevents the platform from being able to turn about the axis of a threaded rod. The integration of a second orifice in the rigid part makes it possible to oppose the pivoting torque of the platform and thus keep it in position.

Depending on the various possible configurations, it may be necessary in the event of a blade loss for the bush to perform a rectilinear or curved displacement movement in order to optimally absorb the energy released by the impact of the blade against the platform.

The bush can be fastened by crimping in the orifice in the flange of the platform.

The invention also relates to a turbomachine, such as an aircraft turbojet, which comprises a fan of the above-described type.

The invention additionally relates to a bush intended to be inserted into an orifice in an inter-blade platform flange and comprising a rigid part and a deformable part, the deformable part having two parallel half-cylinders which are connected by webs of material and whose concavities are oriented in the same direction, the two half-cylinders being aligned with and substantially bearing on cylindrical ends of the rigid part. The aligned ends of one of the half-cylinders and of the rigid part advantageously have interengaged complementary indentations.

In one variant, the rigid part of the bush comprises an orifice and a half-orifice which are parallel, the half-orifice cooperating with a half-orifice of the deformable part.

BRIEF DESCRIPTION OF THE DRAWINGS

Other advantages and features of the invention will become apparent on reading the description below given by way of nonlimiting example and with reference to the appended drawings, in which.

DESCRIPTION OF THE PREFERRED EMBODIMENTS

Figure 1:
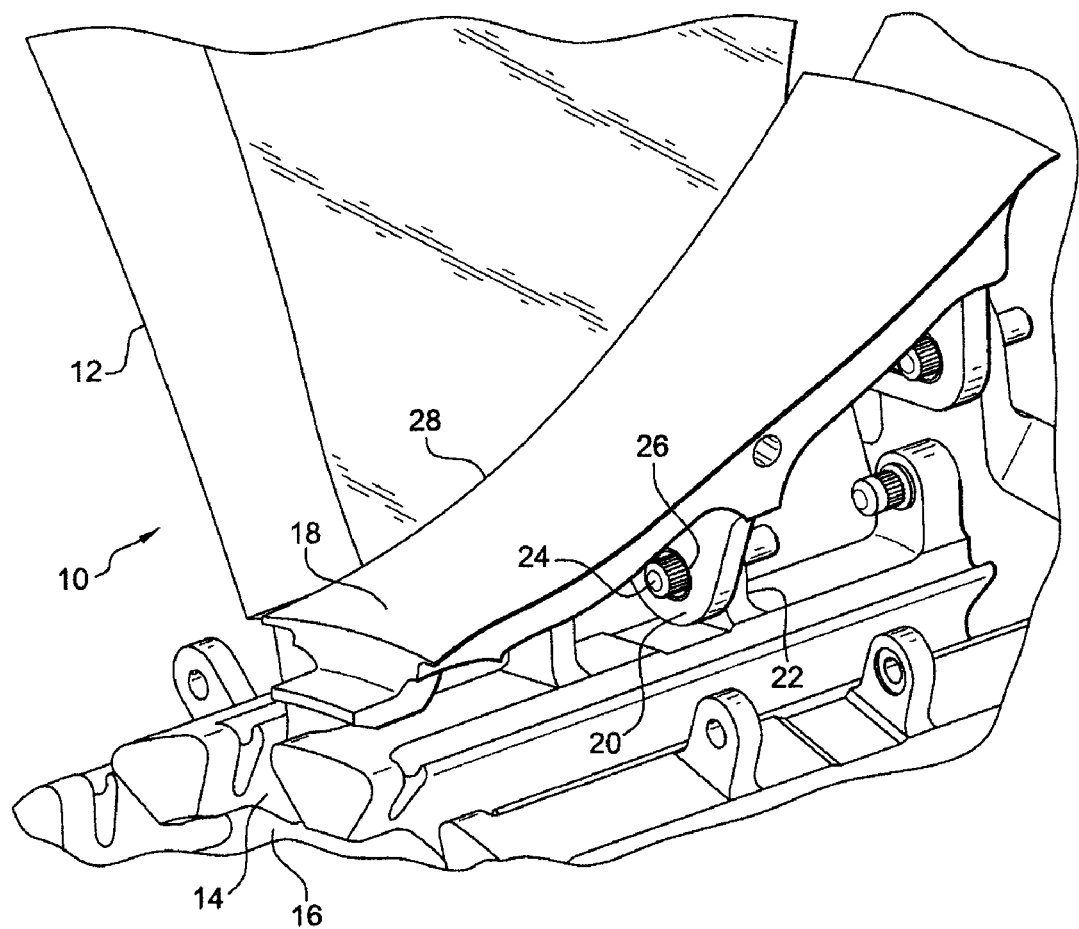
FIG. 1 is a partial schematic perspective view of a fan according to the invention.

Reference will be made first of all to FIG. 1, which represents part of a fan 10 of a turbomachine. A blade 12 of the fan 10, formed by an airfoil connected at its radially internal end to a blade root, is engaged in a peripheral pocket 14 of a rotor disk 16. An inter-blade platform 18 comprises radially inwardly extending flanges 20 fastened to radially outwardly extending flanges 22 of the disk. The flanges 20 of the platform 18 are offset axially and radially. Each flange 20 of the platform is fastened by a threaded rod 24 extending along the axis of the turbomachine through a bush 26 inserted into an orifice in the flange of the platform and through a corresponding orifice in the flange 22 of the disk 12. The threaded rod receives a retaining nut at one of its ends.

In a turbomachine, the platforms 18 must be sufficiently close to the blades 12 to prevent any unwanted air flow toward the disk 16. In the event of a blade loss, the blade 12 is subject to a rotational movement about the axis of the pocket 14 and comes into contact with a lateral edge 28 and/or with the flanges 20 of the platform 18. The impact of the blade 12 against the platform 18 can break the fastenings of the platform 18 on the disk 16 and eject the platform 18.

In order to absorb some of the energy of the impact in the event of a blade loss, the invention makes provision for a deformable element to be interposed transversely in the means for fastening the platform, thereby making more flexible the connection between the flange 20 of the platform 18 and the flange 22 of the disk and allowing a limited pivoting of the platform 18 in the event of a blade loss, while providing good mechanical strength during normal operation of the turbomachine.

Figure 2:
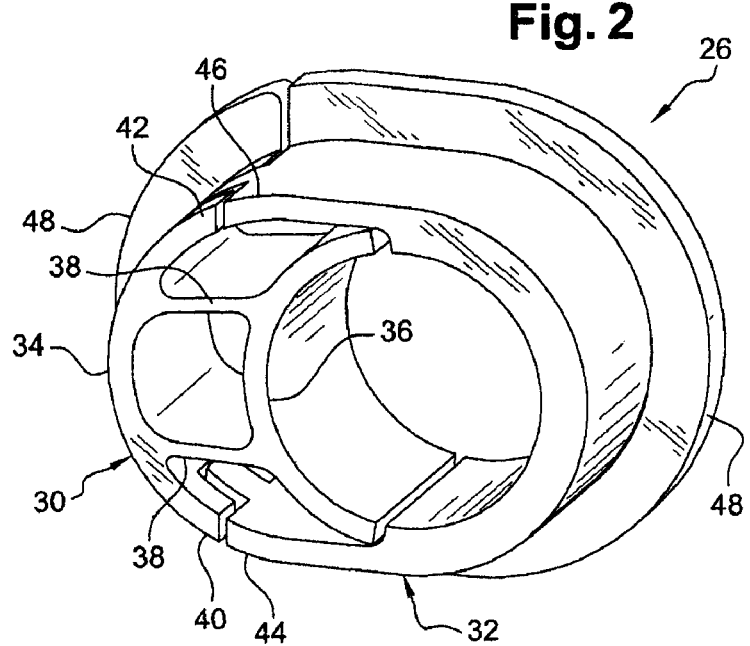
FIG. 2 is a perspective view of a deformable bush according to the invention.
Figure 3:
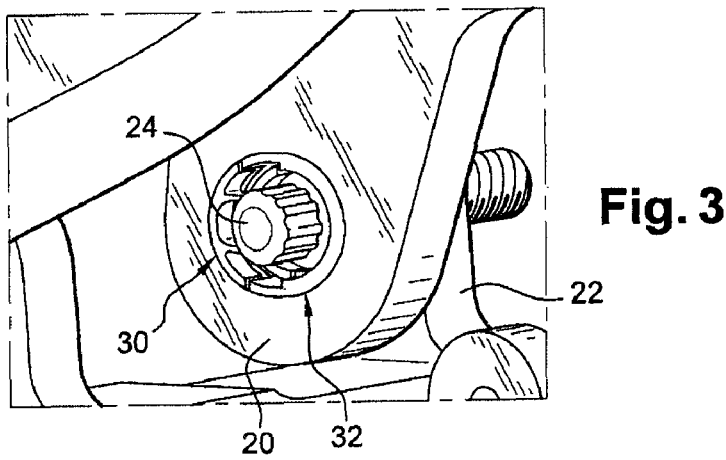
FIG. 3 is a schematic perspective view representing this bush inserted into an orifice in a flange of a platform.

FIGS. 2 and 3 show a bush 26 according to the invention, which is intended to be inserted into an orifice in the flange 20 of the platform 18. The bush 26 is composed of a deformable part 30 and a rigid part 32 which are juxtaposed. The deformable part 30 comprises two parallel half-cylinders 34, 36 whose concavities are oriented in the same direction toward the rigid part 32. The external surface of the external half-cylinder 34 is in contact with an internal cylindrical surface of the orifice in the flange of the platform, the internal surface of the half-cylinder 36 being applied to the threaded rod. The half-cylinders 34, 36 are connected in their intermediate parts by two parallel deformable webs 38. These webs 38 being substantially parallel to a plane tangent to the circumference of the disk 16. The ends of the two half-cylinders 34, 36 of the deformable part 30 are aligned with the ends of the rigid part 32. The ends 40, 42 of the external half-cylinder 34 of the deformable part 30 of the bush 26 have indentations in which there are engaged complementary indentations formed at the ends 44, 46 of the rigid part. This method of connecting the deformable 30 and fixed 32 parts makes it possible to prevent any translational movement of one of the deformable 30 or rigid 32 parts with respect to the other. It is also possible to provide a skirt 48 for crimping the bush 26 in the orifice in the flange 20 of the platform 18 so as to ensure that the bush 26 is retained axially in the orifice in the flange 20 of the platform 18.

In the event of a blade loss, the detached blade will strike the edges 28 and the flange 20 of the platform 18. The energy of the impact is transmitted by the flange of the platform to the deformable part of the bush, which will be compressed to a greater or lesser degree on the threaded rod 24, the webs 38 deforming plastically and thus allowing the platform 18 to be displaced with respect to the threaded rod 24. This displacement can occur along a rectilinear or curved path depending on the desired movement of the platform 18 following the impact of the blade 12 against it. The shape and the dimensions of the webs 38 are chosen on the basis of the deformation threshold desired for the deformable part 30.

The two parts of the bush can be made from identical materials or else from different materials.

According to one possible variant of the invention (not shown), the bush 26 comprises two deformable parts which are symmetrical with respect to the threaded rod.

Figure 4:
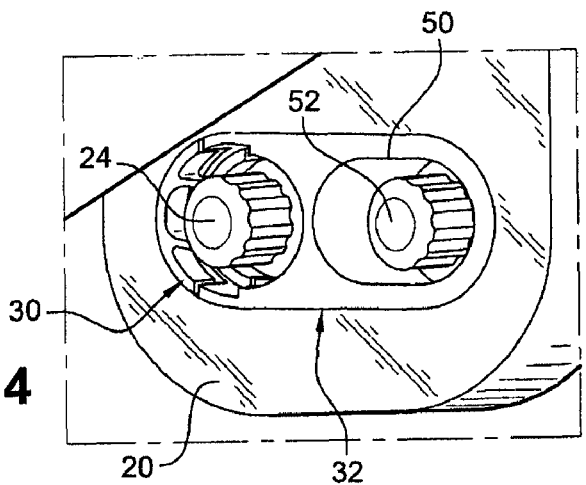
FIG. 4 is a schematic perspective view of a second embodiment of a bush according to the invention, inserted into an orifice in a flange of a platform.

According to one variant of the invention shown in FIG. 4, the rigid part of the bush 26 comprises a second orifice 50 parallel to the first and in which there is inserted a second threaded rod 52 which passes into a second orifice in the flange of the disk. The second orifice makes it possible to oppose a rotation of the platform 18 about a threaded rod and thus keep the platform perfectly in place.

The orifice 50 in the bush receiving the second threaded rod 52 is elongated in a transverse direction. Hence, in the event of a blade loss, the impact causes a deformation of the deformable part 30 of the bush 26 and a displacement of the rigid part 32 with respect to this second threaded rod 52, without butting against this threaded rod.

This second orifice can have varied shapes dependent on the desired displacement of the platform 18. In particular, it can have a curved shape.

The platform 18 can comprise bushes 26 with only one orifice and/or with two orifices according to the fastening method appropriate to each flange 20 of the platform 18.

Although bushes 26 as described above are especially suited to their use with flanges 20 of a platform 18, their applications are not limited to turbomachines and may comprise other types of fastening requiring a certain degree of flexibility in the event of an impact.

The invention claimed is:

1. A turbomachine fan comprising:
   blades carried by a rotor disk; and
   inter-blade platforms having radial flanges fastened to corresponding radial flanges of the rotor disk by threaded rods inserted into positioning bushes mounted in orifices in the flanges of the inter-blade platforms,
   wherein each bush comprises at least one deformable part interposed transversely between the threaded rod inserted into the bush and an edge of the orifice in which the bush is mounted, this deformable part being intended to allow the inter-blade platform to pivot in the event of an impact of a blade against the inter-blade platform and to absorb some of the energy of the impact, the deformable part of the bush being juxtaposed with a rigid part of the bush that is opposed to the deformable part with respect to the threaded rod.

2. The fan as claimed in claim 1, wherein the deformable part comprises two parallel half-cylinders which are connected by deformable webs and whose concavities are oriented in the same direction, one half-cylinder being applied to the threaded rod and the other to an internal cylindrical surface of the orifice in the radial flange of the inter-blade platform.

3. The fan as claimed in claim 2, wherein the ends of the two parallel half-cylinders are aligned with and substantially bear on cylindrical ends of the rigid part of the bush.

4. The fan as claimed in claim 3, wherein the aligned ends of one of the half-cylinders and of the rigid part have interengaged complementary indentations which immobilize the two parts of the bush with respect to one another against translational movement in the orifice in the radial flange of the inter-blade platform.

5. The fan as claimed in claim 2, wherein the parallel half-cylinders of the deformable part are connected by two substantially parallel webs joined to intermediate parts of the half-cylinders.

6. The fan as claimed in claim 3, wherein the deformable webs are substantially parallel to a plane tangent to a circumference of the rotor disk.

7. The fan as claimed in claim 1, wherein the radial flange of the inter-blade platform is fastened to the radial flange of the disk by two parallel threaded rods passing into two adjacent orifices in the radial flange of the disk and into a common orifice in the radial flange of the inter-blade platform in which there is mounted the bush comprising the rigid part and the deformable part, the rigid part being formed with an orifice for the passage of a first threaded rod and with a first half-orifice for the passage of a second threaded rod, the deformable part having a second half-orifice for the passage of the second threaded rod.

8. The fan as claimed in claim 1, wherein in the event of an impact of a blade against the inter-blade platform, the bush is displaced along a rectilinear path.

9. The fan as claimed in claim 1, wherein in the event of an impact of a blade against the inter-blade platform, the bush is displaced along a curved path.

10. The fan as claimed in claim 1, wherein the bush is fastened by crimping in the orifice the radial flange of the inter-blade platform.

11. A turbomachine which comprises a fan comprising:
blades carried by a rotor disk; and
inter-blade platforms having radial flanges fastened to corresponding radial flanges of the rotor disk by threaded rods inserted into positioning bushes mounted in orifices in the flanges of the inter-blade platforms,
wherein each bush comprises at least one deformable part interposed transversely between the threaded rod inserted into the bush and an edge of the orifice in which the bush is mounted, this deformable part being intended to allow the inter-blade platform to pivot in the event of an impact of a blade against the inter-blade platform and to absorb some of the energy of the impact, the deformable part of the bush being juxtaposed with a rigid part of the bush that is opposed to the deformable part with respect to the threaded rod.

12. A bush for fastening a flange of a platform, which comprises a rigid part and a deformable part, the deformable part having two parallel half-cylinders which are connected by deformable webs and whose concavities are oriented in the same direction, the two parallel half-cylinders having ends being aligned with and substantially bearing on cylindrical ends of the rigid part of the bush.

13. The bush as claimed in claim 12, wherein the aligned ends of one of the parallel half-cylinders and of the rigid part have interengaged complementary indentations.

14. The bush as claimed in claim 12, wherein the rigid part comprises an orifice and a half-orifice which are parallel, the half-orifice cooperating with a half-orifice of the deformable part.

15. The bush as claimed in claim 12, wherein the deformable part and the rigid part of the bush are juxtaposable.

\* \* \* \* \*